United States Patent [19]

Ninane et al.

[11] Patent Number: 5,154,909

[45] Date of Patent: * Oct. 13, 1992

[54] SALT HAVING A TRANSLUCENT AND GLASSY APPEARANCE

[75] Inventors: Léon Ninane; Claude Breton, both of Dombasle-sur-Meurthe, France

[73] Assignee: Solvay & Cie (Société Anonyme), Brussels, Belgium

[*] Notice: The portion of the term of this patent subsequent to Jan. 17, 2006 has been disclaimed.

[21] Appl. No.: 637,985

[22] Filed: Jan. 2, 1991

Related U.S. Application Data

[60] Continuation of Ser. No. 213,792, Jul. 1, 1988, abandoned, which is a division of Ser. No. 940,220, Dec. 8, 1986, Pat. No. 4,797,981, which is a continuation of Ser. No. 721,803, Apr. 10, 1985, abandoned.

[30] Foreign Application Priority Data

Apr. 16, 1984 [FR] France ............................. 84 06097

[51] Int. Cl.[5] ......................... A23L 1/237; C01D 3/06
[52] U.S. Cl. ................................ 423/499.5; 423/267; 426/649
[58] Field of Search ............... 423/267, 499; 23/303, 23/313 FB, 313 P; 426/321, 650, 654, 649

[56] References Cited

U.S. PATENT DOCUMENTS

| 475,577 | 8/1892 | Lawton et al. ..................... 423/499 |
| 2,947,603 | 8/1960 | Miller ................................. 423/499 |

FOREIGN PATENT DOCUMENTS

| 688432 | 9/1979 | U.S.S.R. ............................ 423/499 |
| 1142046 | 2/1969 | United Kingdom ........... 23/313 FB |
| 1163888 | 9/1969 | United Kingdom ............... 423/267 |

OTHER PUBLICATIONS

Kaufman, D. W., Sodium Chloride, *The Production And Properties of Salt and Brine*, Reinhold Publishing Corp., NY, 1960, pp. 16, 205-207, 218, 262.
Gmelins Handbuch Der Anorganischen Chemie, 8th Ed., Natrium, Lief. 1, No. 21, 1964, Verlag Chemie GmbH Weinheim/Bergstr., pp. 144-146.
Herdan, G., et al., *Small Particle Statistics*, 1st Ed., 1953, Elsevier Pub. Co., pp. 10-15.
Messing, T., et al., "Industrielle Kristallisation-Moderne Grosstechnische Anlagen und Fallstudien", Chem.-Ing.-Tech. 52 Nr. 11.5., 1980, pp. 870-874.
Svanoe, H., "Krystal" Classifying Crystallizer, Industrial and Engineering Chemistry, vol. 32, No. 5, May 1940, pp. 636-639.
Perry, John H., Ed., "Principles of Size Reduction", *Chemical Engineers' Handbook*, pp. 8-2-8-12.
Blazy, Pierre, "La Valorisation Des Minerals", *Manual of Mineralugie*, 1970, p. 51.
Grainer Salt, R. B. Richards, pp. 262-263.
Bavarten von Kristallisatosen, Wöhlk et al, Chem-Ing-.-Tech. 57 (1985) Nr. 4, pp. 318, 323-327.

*Primary Examiner*—Jeffrey E. Russel
*Attorney, Agent, or Firm*—Spencer, Frank & Schneider

[57] ABSTRACT

Process for the production of salt in which sodium chloride is crystallized in the form of spheres by evaporation of a sodium chloride brine and the spheres obtained are then broken up. The salt produced by the process is particularly suitable for the food industry.

18 Claims, No Drawings

SALT HAVING A TRANSLUCENT AND GLASSY APPEARANCE

This application is a continuation of application Ser. No. 07/213,792 filed Jul. 1, 1988, now abandoned, which is a division of application Ser. No. 06/940,220 filed Dec. 8, 1986, now U.S. Pat. No. 4,797,981 issued Jan. 17, 1989, which is a continuation of Ser. No. 06/721,803 filed Apr. 10, 1985, now abandoned.

BACKGROUND OF THE INVENTION

1. Field of the Invention

The present invention relates to a process for the production of salt. More particularly, it concerns a process according to which sodium chloride is crystallised by evaporation of a sodium chloride brine.

2. Background of the Art

A process which has been in use for a long time for manufacturing food-grade salt consists in heating a sodium chloride brine below its boiling point, in open basins or pans, of a low height, which have a large evaporation area ("Sodium Chloride", Kaufmann, Reinhold Publishing Corp., 1960, p. 262).

The salt obtained by this known process, usually called "pan salt", is generally in the form of coarse, non-uniform particles, translucent and glassy in appearance, which is easy to use and which is, consequently, valued by certain users, for example for salt-preserving methods.

However, this salt manufacturing process has the disadvantage of being too costly, since the efficiency of heating brines in the pans is, in fact, very low. It has the additional disadvantage of requiring plant which occupies a very large ground area.

To overcome the above-mentioned disadvantages of this known process it has also been proposed to process sodium chloride brines in multistage evaporators (op. cit., p. 205).

Compared to the process for manufacturing pan salt described earlier, the use of multistage evaporators, which generally operate at a reduced pressure, permits a considerable fuel saving and is, moreover, adaptable to plant which occupies a smaller ground area.

However, the salt obtained by this known process is completely different from pan salt in appearance; it is usually in the form of fine particles, matt and opaque in appearance, the uses of which do not generally correspond to those of pan salt.

SUMMARY OF THE INVENTION

The invention is aimed at providing a process which permits the production, at a low cost, of a salt having properties which are similar to those of pan salt.

To this end, the invention relates to a process for the production of salt, according to which sodium chloride is crystallised by evaporation of a sodium chloride brine. According to the invention, sodium chloride is crystallised in the form of spheres which are subsequently broken up.

In the process according to the invention, the crystallisation can be carried out by any suitable means capable of producing salt in the form of spheres by evaporation of a brine. According to the invention, it is advantageous that the salt spheres produced have a diameter which is greater than 3 mm. In practice, it is not desirable for the diameter of the spheres to exceed 15 mm. Diameters which are particularly suitable are those between 4 and 10 mm, and especially those of at least 5 mm.

A means which is particularly suitable for crystallising sodium chloride spheres is that described in Chem. Ing. Techn. 52 (1980) No. 11, pages 872 and 873. According to this means, the sodium chloride brine is first evaporated in a controlled manner to supersaturate it with sodium chloride, and it is then circulated through a fluid bed of sodium chloride particles.

The purpose of breaking up the spheres is to produce salt particles having the required particle size distribution. This may be carried out by any suitable means.

According to a preferred embodiment of the invention, the breaking up is controlled so that the particle size is at most 4 mm. As a general rule, it is not desirable for the salt produced by the breaking up to contain a considerable fraction of fine particles the size of which is below 0.25 mm. In practice, it is desirable that the fraction of particles below 0.25 mm in size does not exceed 2.5% by weight of the salt.

To avoid excessive formation of fine salt particles, it is advantageous, according to a particular embodiment of the invention, to break up the spheres in a moist state. In this embodiment of the invention, it is generally appropriate to employ a quantity of water which is at least 2 g, preferably 10 g, per kg of dry solids. It is not desirable for the quantity of water employed to exceed 75 g per kg of dry solids, quantities below 50 g being preferred. Quantities of water of between 5 and 20 g per kg of dry solids are generally suitable.

The temperature at which the breaking up is carried out is not critical. It can usually be carried out at the temperature at which the sodium chloride spheres are produced, for example between 50° and 90° C., in the case where the evaporation of the sodium chloride brine is carried out between 90° and 110° C.

The invention also relates to the salt obtained by means of a process according to the invention, as described above.

The salt according to the invention is in the form of particles of various sizes over a wide range of particle size distribution. It has a variety of uses, particularly in the processing of hides, in the food industry, for example, in the preparation of salt-preserves, and in the culinary industry.

DESCRIPTION OF THE PREFERRED EMBODIMENTS

According to a particular embodiment, the salt according to the invention is in the form of particles below 4 mm in size, having a particle size distribution defined by a mean diameter of between 1.00 and 2.50 mm and a standard deviation of between 0.50 and 1.50 mm, the mean diameter d and the standard deviation $\sigma$ being defined by the following relationships (G. Herdan "Small particle statistics" 2nd edition, 1960, Butterworths, pages 10 and 11):

$$d = \frac{\Sigma n_i d_i}{\Sigma n_i} \quad \text{and} \quad \sigma = \sqrt{\frac{\Sigma n_i (d_i - d)^2}{\Sigma n_i}}$$

where $n_i$ denotes the frequency (for example the weight) of particles of size $d_i$. This type of salt is especially suitable for the food industry. In a preferred embodiment, the mean diameter is between 1.8 and 2.2 mm and the standard deviation is between 0.8 and 1.2 mm.

The salt according to the invention has physical properties which are substantially identical to those of pan salt. It has good pourability and excellent suitability for salt-preserving methods. It has a translucent and glassy appearance similar to that of pan salt and its use for salting foodstuffs is at least as easy as that of pan salt.

To improve the pourability of the salt obtained by the process according to the invention still further and to facilitate its use still further, an anticaking substance generally employed in the production of foodgrade salt (Gmelins Handbuch der anorganischen Chemie, 8. Auflage, Natrium, Lief. 1, No. 21, 1964, p. 144 to 146) may be mixed therewith, in an alternative embodiment. A preferred anticaking substance is potassium ferrocyanide.

Detailed features of the invention will become apparent from the following description of an embodiment of the process according to the invention.

Sodium chloride spheres approximately 5 mm in diameter were crystallised by evaporation of a sodium chloride brine using the fluid bed method described in Chem.-Ing.-Techn. 52 (1980) No. 11, pages 872 and 873. A suspension of spheres in a saturated brine at approximately 100° C. was drawn off from the bottom of the fluid bed. The suspension, which contained 500 g of spheres per kg, was filtered on a cloth in order that the spheres collected have a moisture content of approximately 9.7 g $H_2O$/kg.

One kg of moist spheres obtained in this way was ground by a pass between a pair of smooth rolls 200 mm in diameter, 200 mm in length, rotating at a speed of 374 revolutions per minute. Roll separation was fixed at 2.5 mm. The salt collected at the end of the grinding conformed to the invention and had the following cumulative particle size distribution:

| Screen opening (mesh diameter in mm) | Passing (weight %) |
| --- | --- |
| 0.25 | 5 |
| 0.50 | 11 |
| 0.71 | 15 |
| 1.0 | 21 |
| 2.0 | 57 |
| 4.0 | 100 |

This particle size distribution is characterised by a mean diameter of 1.93 mm and a standard deviation of 1 mm.

We claim:

1. Salt for salt-preserves or salting foodstuffs consisting essentially of salt having a translucent and glassy appearance, a particle shape of broken spheres including surfaces which are at least partially spherical, a non-uniform particle size, and a mean diameter ranging from 1.00 to 2.50 mm, and being prepared by a process comprising:
    subjecting a sodium chloride brine to crystallization by evaporation under conditions which result in the formation of sodium chloride having the form of spheres, which spheres have a mean diameter of at least 3 mm; and
    breaking up the spheres.

2. The salt according to claim 1, wherein the salt has a particle size below 4 mm and has a particle size distribution defined by a mean diameter of between 1.00 and 2.50 mm and a standard deviation of between 0.50 and 1.50 mm.

3. The salt according to claim 2, wherein the mean diameter is between 1.8 and 2.2 mm and the standard deviation is between 0.8 and 1.2 mm.

4. The salt according to claim 1, wherein the crystallization of the sodium chloride brine is accomplished by subjecting same to evaporation to provide a supersaturated sodium chloride brine which is supersaturated with sodium chloride, and circulating the supersaturated sodium chloride brine through a fluid bed of sodium chloride particles.

5. The salt according to claim 1, wherein the evaporation is carried out at a temperature of between 90° and 100° C., and the breaking up is carried out at a temperature of between 50° and 90° C.

6. The salt according to claim 1, wherein the spheres are broken up while in a moist state.

7. The salt according to claim 6, wherein the moisture content of the spheres subject to the breaking up is controlled so that the spheres contain between 5 and 20 g of water per kg of dry solids.

8. The salt according to claim 4, wherein the spheres are broken up while in a moist state.

9. The salt according to claim 8, wherein the moisture content of the spheres subjected to the breaking up is controlled so that the spheres contain between 5 and 20 g of water per kg of dry solids.

10. Salt for salt-preserves or salting foodstuffs consisting essentially of salt having a translucent and glassy appearance, a particle shape of broken spheres including surfaces which are at least partially spherical, a non-uniform particle size, and a mean diameter ranging from 1.00 to 2.50 mm.

11. The salt according to claim 10, wherein the salt has a particle size below 4 mm and has a particle size distribution defined by a mean diameter of between 1.00 and 2.50 mm, and a standard deviation of between 0.50 and 1.50 mm.

12. The salt according to claim 11, wherein the mean diameter is between 1.8 and 2.2 mm, and the standard deviation is between 0.8 and 1.2 mm.

13. A salt composition for salt-preserves or salting foodstuffs, comprising:
    salt comprised of sodium chloride and having a translucent and glassy appearance, a particle shape of broken spheres including surfaces which are at least partially spherical, a non-uniform particle size, and a mean diameter ranging from 1.00 to 2.50 mm, and
    an anticaking substance.

14. The salt composition according to claim 13, wherein the anticaking substance is potassium ferrocyanide.

15. The salt composition according to claim 13, wherein the salt consists essentially of sodium chloride.

16. A salt composition for salt-preserves or salting foodstuffs, comprising:
    salt comprised of sodium chloride and having a translucent and glassy appearance, a particle shape of broken spheres including surfaces which are at least partially spherical, a non-uniform particle size, and a mean diameter ranging from 1.00 to 2.50 mm; and
    an anticaking substance,
    wherein the salt is prepared by a process, comprising:
    subjecting a sodium chloride brine to crystallization by evaporation under conditions which result in the formation of sodium chloride having the form of spheres, which spheres have a mean diameter of at least 3 mm; and
    breaking up the spheres.

17. The salt composition according to claim 16, wherein the anticaking substance is potassium ferrocyanide.

18. The salt composition according to claim 16, wherein the salt consists essentially of sodium chloride.

* * * * *